United States Patent [19]
Park et al.

[11] Patent Number: 6,129,860
[45] Date of Patent: Oct. 10, 2000

[54] PHOSPHOR OF GREEN LUMINESCENCE

[75] Inventors: Do Soon Park; Ha Kyun Jung, both of Daejeon, Rep. of Korea

[73] Assignee: Korea Research Institute of Chemical Technology, Rep. of Korea

[21] Appl. No.: 09/238,422

[22] Filed: Jan. 28, 1999

[30] Foreign Application Priority Data

Mar. 9, 1998 [KR] Rep. of Korea ......................... 98/7760

[51] Int. Cl.[7] .................................................. C09K 11/00
[52] U.S. Cl. .............................. 252/301.4 F; 252/301.4 R
[58] Field of Search ....................... 252/301.4 F, 301.4 R

[56] References Cited

U.S. PATENT DOCUMENTS 2,569,940  10/1951  Lyon ................................ 252/301.4 F
2,570,136  10/1951  Lyon ................................ 252/301.4 F

OTHER PUBLICATIONS

Journal of the Electrochemical Society, vol. 136, No. 6, "Degradation Mechanism for Low Voltage Cathodolumines cence of Sulfide Phosphors", Shigeo Itoh, et al., pp. 1819–1823, Jun. 1989.

Chemical Physics Letters, vol. 113, No. 3, $^5D_3$–$^5D_4$ Cross–Relaxation of $Tb^{3+}$ IN α–GdOF, P.A.M. Derdowski et al. pp. 387–390, Jan. 18, 1985.

*Primary Examiner*—C. Melissa Koslow
*Attorney, Agent, or Firm*—Finnegan, Henderson, Farabow, Garrett & Dunner, LLP

[57] ABSTRACT

The present invention relates to a novel phosphor of green luminescence and more particularly, to the phosphor of green luminescence containing Tb(terbium) as an activator and a perovskite-structure($CaSnO_3$) as a host compound, which may emit a luminescent spectrum in the visible range, when excited by electron beam. Since the phosphor of green luminescence of this invention has better emission intensity than the conventional phosphors, it has been widely applicable to the display industry including an electronic display such as cathode-ray tube and field emission display, in spite of the fact the use of Tb, a high-priced rare earth element, is minimized without any sulfur(S) in its chemical composition.

3 Claims, 2 Drawing Sheets

PHOSPHOR OF GREEN LUMINESCENCE

BACKGROUND OF THE INVENTION

1. Field of the Invention

The present invention relates to a novel phosphor of green luminescence and more particularly, to the phosphor of green luminescence containing Tb(terbium) as an activator and a perovskite-structure($CaSnO_3$) as a host compound, which may emit a luminescent spectrum in the visible range, when excited by electron beam. The phosphor of green luminescence of this invention with better luminescence than the conventional phosphors has been widely applicable to the display industry including an electronic display such as cathode-ray tube(CRT) and field emission display(FED) etc., in spite of the fact the use of Tb, a high-priced rare earth element, is minimized without any sulfur(S) in its chemical composition.

2. Description of the Related Art

Hitherto, many researches have focused on RGB phosphors for an electronic display to emit the colors, which are core materials in the display industry. To this end, the phosphors of various host compounds have been intensively studied in phosphors using Tb(terbium), a rare earth element as an activator.

In general, the phosphor induced by Tb activator emits both a blue luminescent spectrum mainly based on the transfer of $^5D_3 \rightarrow {}^7F_j(j=1\sim6)$ and a green luminescent spectrum mainly based on the transfer of $^5D_4 \rightarrow {}^7F_j(j=1\sim6)$ in the visible range. More specifically, it has been reported that a spectrum in the blue range at a low concentration of Tb is observed and as the concentration of Tb increases, only a spectrum of the green range is observed, while a spectrum in the blue range disappears[Chem. Phys. Lett., 113,387 (1985)].

Examples of the phosphors using Tb, which are still under review for commercial use, include Tb-activated yttrium silicate phosphor ($Y_2SiO_5$:Tb), Tb-activated YAG phosphor ($Y_3Al_5O_{12}$:Tb) and Tb-activated yttrium oxide phosphor ($Y_2O_3$:Tb).

The optimum concentrations of Tb used in the phosphors expressed by $Y_2SiO_5$:Tb, $Y_3Al_5O_{12}$:Tb, and $Y_2O_3$:Tb are about 2.5 mol %, 5 mol % and 7 mol %, respectively. These relatively large amounts reflect that since the solid solubility limit of these host compounds on Tb in the phosphors is high, each host compound has a larger capacity of incorporating the Tb activator.

However, the conventional Tb-activated phosphors are not sufficient in emission intensity in spite of its a higher content of Tb in its chemical composition. Thus, there is a need that the phosphor with better luminescence characteristics should be developed together with a technology to lessen the use of high-priced Tb in the economic aspect.

In addition, when phosphors are under consideration for use in an electronic display such as field emission display, the conventional phosphors of green luminescence containing some sulfur compounds expressed by ZnS:Cu,Al; (Zn, Cd)S:Cu and ZnS:Cu,Au,Al phosphors etc. are known to contaminate the emitter tips by the release of corrosive, sulfur-related gases(e.g., $SO_2$, SO) under prolonged electron bombardment [*J. Electrochem. Soc.*, 136(6), 1819 (1989)]. Thus, an alternative use of new oxide phosphor is required as a phosphor of green luminescence.

SUMMARY OF THE INVENTION

Under such circumstances, the inventor et al. have made intensive studies to obtain a phosphor with better luminescence characteristics than conventional phosphors of green luminescence using Tb as an activator and found that if a host compound derived from calcium and tin is employed, a phosphor of green luminescence with better luminescence characteristics may be obtained, despite the fact that the content of high-priced Tb activator is reduced without sulfur in its chemical composition. Thus, this invention has been completed.

Therefore, an object of this invention is to provide a novel phosphor of green luminescence comprising Tb as an activator and a host compound derived calcium and tin, thus ensuring better luminescence characteristics than that of the conventional phosphors and minimizing the use of Tb.

DETAILED DESCRIPTION OF THE INVENTION

This invention is characterized by a novel phosphor of green luminescence using Tb as an activator and $CaSnO_3$ as a host compound, wherein the general formula is expressed by $CaSnO_3$:Tb.

This invention is explained in more detail as set forth hereunder.

According to this invention, $CaSnO_3$ is used as a host compound for the phosphor containing Tb as an activator. From the general formula($CaSnO_3$:Tb) of the phosphor, it is preferred that the concentration of Tb is at least more than 0.025 mol % in the host compound. If the concentration is less than 0.025 mol %, its emission intensity becomes weak.

The phosphor of this invention emits very excellent green luminescence in the visible range, when excited by electron beam.

According to this invention, one or more calcium compounds may be selected from the group consisting of calcium oxide, calcium carbonate and calcium oxalate; one or more tin compounds may be selected from the group consisting of tin oxide and tin oxalate; one or more terbium compounds may be selected from the group consisting of terbium oxide, terbium carbonate and terbium oxalate. The three compounds derived from calcium, tin and terbium may be mixed by a wet or dry process, or coprecipitation based on the chemical composition of $CaSnO_3$:Tb. The mixture of such raw materials is charged into an alumina crucible and fired in air or under oxygen atmosphere at 1,000~1,600° C. for 1~12 hours, preferably once or more times. Hence, it is preferred that the final calcination is necessarily performed at more than 1,100° C. in building a single phase.

Then, the calcined material is pulverized and sieved in a size of less than 100 μm to obtain a $CaSnO_3$:Tb phosphor, a phosphor of green luminescence of this invention.

As such, the $CaSnO_3$:Tb phosphor of this invention is characterized in that the crystal of host compound having a perovskite structure has a small solid solubility on an activator Tb, and unlike the conventional Tb-activated phosphors, the phosphor of this invention does not emit a blue-emitting spectrum irrespective of Tb concentration but emits a green-emitting spectrum only.

Figure 1:
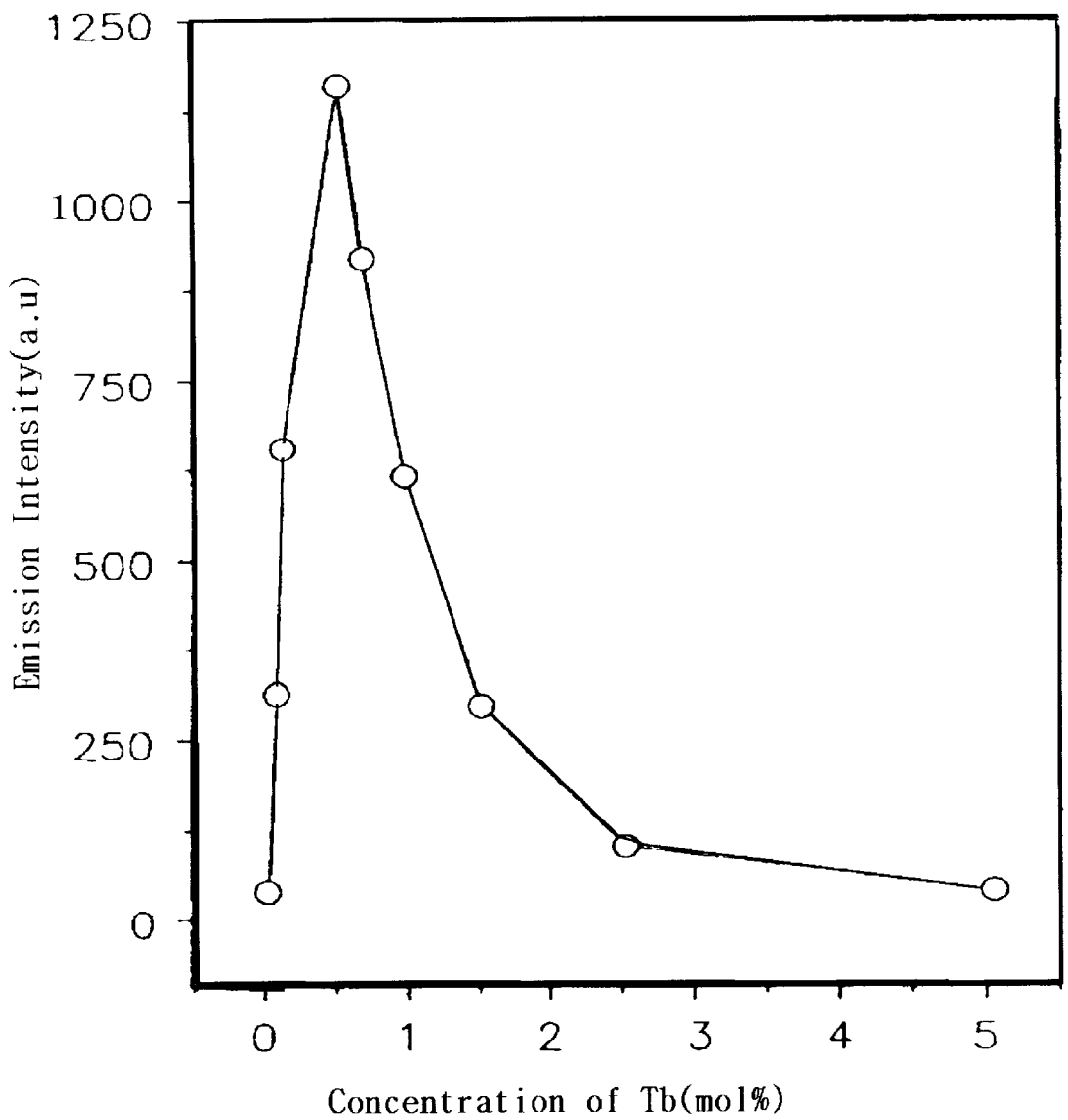
FIG. 1 is a graph showing a relationship between the concentration of Th, an activator and emission intensity of the phosphor of this invention expressed by $CaSnO_3$:Tb.

As a result of exciting the $CaSnO_3$:Tb phosphor of this invention by electron beam of 254 nm wavelength so as to review the relationship between the emission intensity and Tb concentration of $CaSnO_3$:Tb phosphor, the results are obtained, as illustrated in FIG. 1. As exhibited in FIG. 1, the activator Tb in the phosphor of this invention shows a significant emission intensity at the concentration of more than 0.025 mol %. Also, the emission intensity becomes higher at the activator Tb concentration of more than 0.1 mol % and the upper concentration limit of activator Tb is 5 mol %. In particular, a concentration of activator Tb is preferably in the range of 0.1~2.5 mol %.

Figure 2:
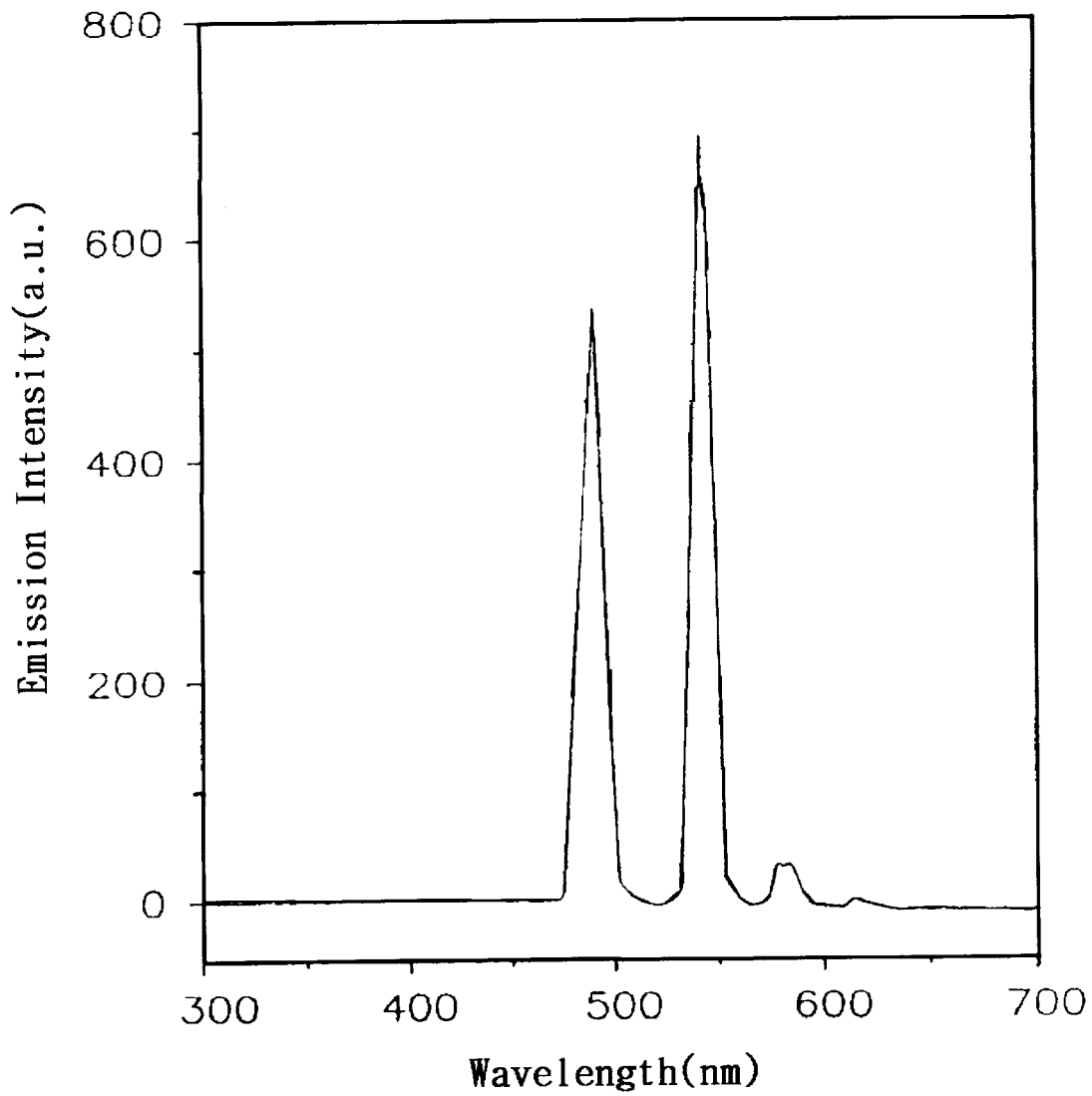
FIG. 2 shows a emission spectrum on the phosphor expressed by $CaSnO_3$:0.002Tb prepared from Example 1 of this invention.

Through some studies to investigate the fact that the $CaSnO_3$:Tb phosphor of this invention exhibits a green luminescence or not, it has been confirmed that as shown in FIG. 2, the phosphor of this invention has a specific green luminescent spectrum of Tb ion having a emission maximum at the wavelength of 545 nm. Thus, it is deemed that compared to the conventional phosphors of green luminescence, the phosphor of this invention has an excellent emission intensity.

This invention is explained in more detail based on the following examples but is not limited by these examples.

EXAMPLE 1

Raw material contents:

| | |
|---|---|
| CaO | 1.119 g |
| $SnO_2$ | 3.014 g |
| $Tb_4O_7$ | 0.008 g |

A mixture of the above three compounds was mixed by wet ball-mill and dried. The dried mixture was charged into an alumina crucible and fired in air at 1,200° C. for 2 hours by a muffle furnace. The calcined material, so formed, was pulverized in a mortar and sieved at the size of less than 100 $\mu$m to obtain a desired phosphor.

The composition of the phosphor substance thus obtained was $CaSnO_3$0.002Tb. When the phosphor was excited by energy source of 254 nm, there was the same emission spectrum (a specific green emission spectrum of Tb ion having an emission maximum at the wavelength of 545 nm) as shown in FIG. 2.

EXAMPLE 2–9

Phosphors were obtained in the same manner as Example 1, except for using the following materials. The emission intensities according to the chemical composition of the phosphors, so formed, were shown in the following table 1.

TABLE 1

| | Composition of | Mixing ratio of raw materials(g) | | | Emission intensity |
|---|---|---|---|---|---|
| Category | phosphor | CaO | $SnO_2$ | $Tb_4O_7$ | (a.u.) |
| Examp. 1 | $CaSnO_3$:0.002Tb | 1.119 | 3.014 | 0.008 | 650 |
| Examp. 2 | $CaSnO_3$:0.00025Tb | 1.121 | 3.014 | 0.001 | 37 |
| Examp. 3 | $CaSnO_3$:0.001Tb | 1.120 | 3.014 | 0.004 | 312 |
| Examp. 4 | $CaSnO_3$:0.005Tb | 1.116 | 3.014 | 0.019 | 1180 |
| Examp. 5 | $CaSnO_3$:0.007Tb | 1.114 | 3.014 | 0.026 | 920 |
| Examp. 6 | $CaSnO_3$:0.01Tb | 1.110 | 3.014 | 0.037 | 620 |
| Examp. 7 | $CaSnO_3$:0.015Tb | 1.105 | 3.014 | 0.056 | 296 |
| Examp. 8 | $CaSnO_3$:0.025Tb | 1.094 | 3.014 | 0.093 | 96 |
| Examp. 9 | $CaSnO_3$:0.05Tb | 1.065 | 3.014 | 0.187 | 37 |

COMPARATIVE EXAMPLE 1

Raw material contents:

| | |
|---|---|
| $Y_2O_3$ | 3.486 g |
| $SiO_2$ | 0.961 g |
| $Tb_4O_7$ | 0.209 g |

A mixture of the above three compounds was mixed by wet ball-mill and dried. The dried mixture was charged into an alumina crucible and fired in air at 1,200° C. for 3 hours by a muffle furnace. The calcined material, so formed, was pulverized in a mortar, sieved at the size of less than 100 $\mu$m to obtain a desired phosphor.

The composition of the phosphor substance thus obtained was $Y_2SiO_5$:0.07Tb. When the phosphor was excited by energy source of 254 nm, there was the same emission spectrum (a specific green emission spectrum of Tb ion having an emission maximum at the wavelength of 545 nm).

The emission intensity of the phosphors with the above chemical composition was shown in the following table 2.

COMPARATIVE EXAMPLE 2

Raw material contents:

| | |
|---|---|
| $Y_2O_3$ | 2.665 g |
| $Al_2O_3$ | 2.039 g |
| $Tb_4O_7$ | 0.075 g |

A mixture of the above three compounds was mixed by wet ball-lill and dried. The dried mixture was charged into an alumina crucible and fired in air at 1,500° C. for 3 hours by a muffle furnace. The calcined material, so formed, was pulverized in a mortar, sieved at the size of less than 100 $\mu$m to obtain a desired phosphor.

The composition of the phosphor substance thus obtained was $Y_3Al_5O_{12}$:0.05Tb. When the phosphor was excited by energy source of 254 nm, there was the same emission spectrum (a specific green emission spectrum of Tb ion having an emission maximum at the wavelength of 545 nm).

The emission intensity of the phosphors with the above chemical composition was shown in the following table 2.

TABLE 2

| Category | Composition of phosphor | Mixing ratio of raw materials (g) | | | | Emission intensity |
|---|---|---|---|---|---|---|
| | | $Y_2O_3$ | $SiO_2$ | $Al_2O_3$ | $Tb_4O_7$ | (a.u.) |
| Comp. examp. 1 | $Y_2SiO_5$:0.07Tb | 3.486 | 0.961 | — | 0.209 | 74 |
| Comp. examp. 2 | $Y_3Al_5O_{12}$:0.05Tb | 2.665 | — | 2.039 | 0.075 | 71 |

Based on the comparison from Examples 1–9 and Comparative examples 1–2, it was noted that the phosphor of this invention has proven to have its excellent emission intensity with less content of an activator such as Tb, compared with the conventional Tb-activated phosphors of green luminescence.

As mentioned above, the novel phosphor of green luminescence with a perovskite-structure($CaSnO_3$) as a host compound is advantageous in that unlike the conventional Tb-activated phosphors, the phosphor of this invention has an excellent luminescence intensity with great economy and excellent resistance to electron bombardment because the use of Tb, a high-priced rare earth element, can be minimized without a content of any sulfur(S) in its chemical composition. Therefore, it has been widely applicable to the display industry including an electronic display such as cathode-ray tube and field emission display etc..

What is claimed is:

1. A novel phosphor of green luminescence using Tb as an activator and $CaSnO_3$ as a host compound, expressed by $CaSnO_3$:Tb as a general formula.

2. The novel phosphor of green luminescence according to claim 1, wherein the concentration of Tb, an activator of said phosphor, is in the range of 0.025 to 5 mol %.

3. The novel phosphor of green luminescence according to claim 2, wherein the concentration of Tb, an activator of said phosphor, is in the range of 0.1 to 2.5 mol %.

* * * * *

UNITED STATES PATENT AND TRADEMARK OFFICE
CERTIFICATE OF CORRECTION

PATENT NO.   : 6,129,860

DATED:       October 10, 2000

INVENTORS:   Do Soon PARK et al.

It is hereby certified that errors appear in the above-identified patent and that said Letters Patent is hereby corrected as shown below:

Claim 2, Col. 6, line 7, after "range of", insert --from--.

Claim 3, Col. 6, line 10, "0.1 to 2.5" should read --about 0.1 to about 2.5--

On the Title Page, Col. 1, item [75], line 1, after "Ha Kyun Jung", delete "both" and insert--; Hee Song Park, all --

Signed and Sealed this

Fifteenth Day of May, 2001

*Attest:*

NICHOLAS P. GODICI

*Attesting Officer*        *Acting Director of the United States Patent and Trademark Office*